Oct. 22, 1935.  W. G. HOELSCHER ET AL  2,018,363
ATTACHMENT FOR MACHINE TOOLS
Filed May 19, 1934
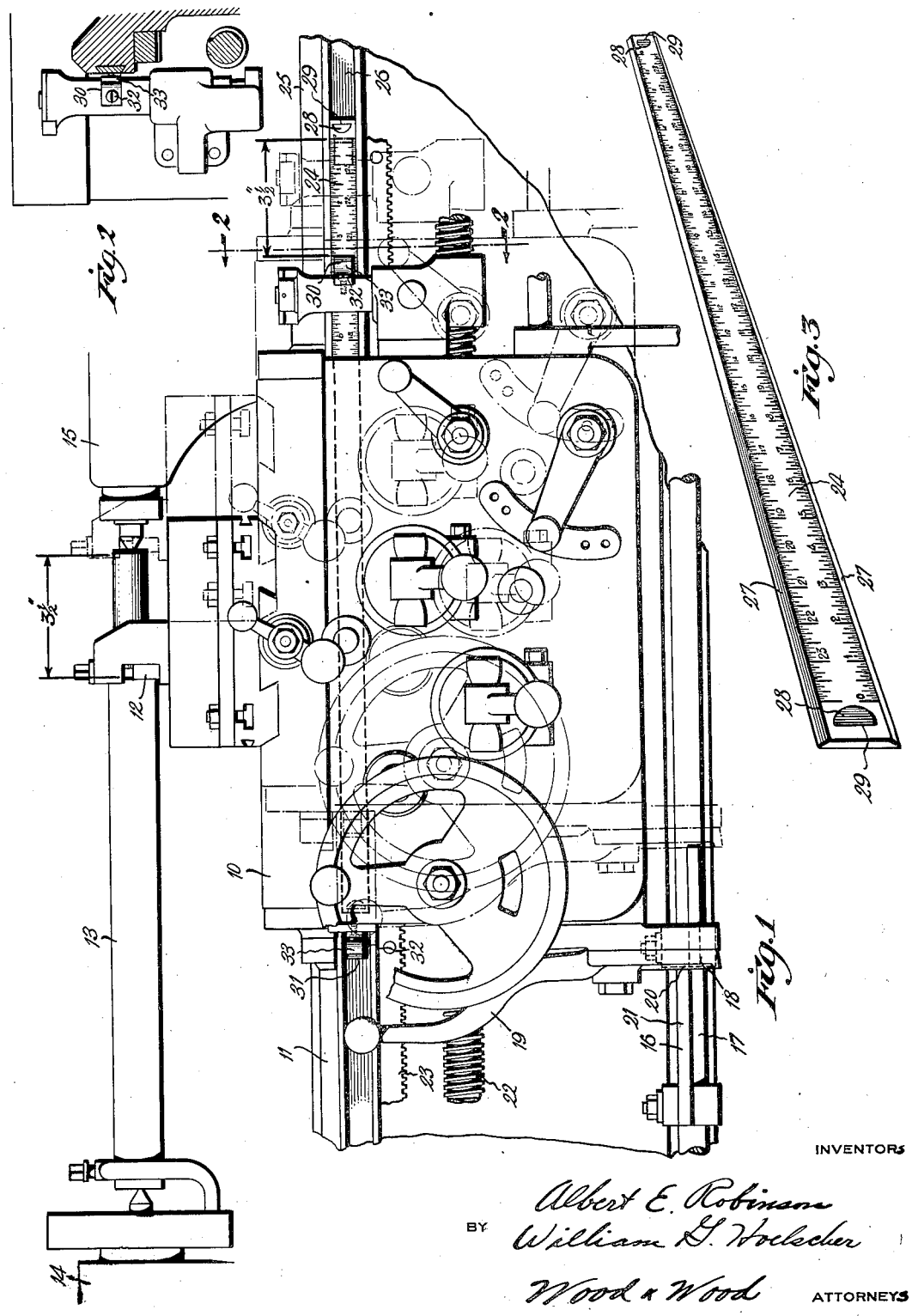
INVENTORS
Albert E. Robinson
BY William G. Hoelscher
Wood & Wood   ATTORNEYS Patented Oct. 22, 1935

2,018,363

UNITED STATES PATENT OFFICE 2,018,363

ATTACHMENT FOR MACHINE TOOLS

William G. Hoelscher, Norwood, and Albert E. Robinson, Cincinnati, Ohio, assignors to The American Tool Works Company, Cincinnati, Ohio, a corporation of Ohio Application May 19, 1934, Serial No. 726,552

5 Claims. (Cl. 82—34)

This invention relates to machine tools, and is particularly directed to a carriage feed measuring and reading device preferably for use on lathes.

The average lathe construction employs a series of longitudinal stop dogs arranged along the side of the lathe bed, each being effective for disconnecting the carriage feeding mechanism so that a series of definite carriage length feeds can be accomplished for multiple diameter counterturning work.

In performing machining operations of this character such as multiple diameter counterturning shafts, it is necessary to measure off and locate a series of work shoulders along the shaft for appropriately setting the conventional longitudinal stop dogs which disconnect the feed to the carriage. It has been the practice to measure off the work shoulders and set the stop dogs by manipulation of an ordinary scale. This method obviously is apt to cause inaccuracy and necessarily involves considerable set-up time.

It is the object of this invention to provide a simple and easily used feed measuring and reading device, mounted in the machine and associated with the carriage, by means of which the operator can conveniently and accurately set the longitudinal stop dogs for the carriage and at the same time accomplish a material reduction in stop setting time. The device preferably utilized may be in the form of a scale or graduated bar mounted longitudinally of the lathe along the range of travel of the carriage.

It is a further object of this invention to provide an adjustable graduated scale bar of this character which carries graduations reading from both ends of the scale, whereby it is possible for the operator to perform a multiple counterturning operation and thereafter reverse the work end for end between centers, subsequently, locating the remaining shoulders at the opposite end by readings taken from the last shoulder of the first counterturned end.

Other objects and further advantages will be more fully apparent from a description of the accompanying drawing, in which:

Figure 1 is a side view of the intermediate portion of a lathe bed, showing the carriage and showing the measuring device of this invention associated with these parts, and illustrating a stop dog setting operation.

Figure 2 is a sectional view taken on line 2—2, Figure 1.

Figure 3 is a perspective view of the scale or measuring bar showing it apart from the lathe.

It is preferable to mount the measuring bar or scale of this invention along the side of the lathe bed adjacent the carriage and to provide pointers on the carriage movable relative to the graduations of the scale for accurately determining the distance of carriage movement.

Referring to Figure 1 of the drawing, the carriage is indicated at 10 mounted in the conventional manner on the lathe bed 11 for feed longitudinally of the bed and movement of the tool 12 along the work 13 as supported between the headstock 14 and tailstock 15. The details of the cross slide are not shown inasmuch as the present improvement relates entirely to determination of the carriage longitudinal movements.

The current practice is to control the feed of the carriage by means of longitudinal stop dogs 16 adjustably secured on a control bar 17 extending along the side of the lathe bed. This bar is connected to the control of the feed transmission (not shown) and is effective upon slight longitudinal translative movement for disconnecting the feed to the carriage. The carriage has a swinging abutment 18 including a lever 19 mounted at one end including a contact portion 20 which is swung into position for abutment with the respective dogs adjustably distributed along the control bar. Each stop dog includes a longitudinally projected portion 21, the tip of which is adapted to be contacted by the abutment element 18 of the carriage. The carriage is traversed by the usual feed screw 22 or by means of a rack 23 as may be desired, and incorporates various control levers generally disclosed, to which parts no further reference is believed necessary.

The scale or measuring bar 24 is adjustably fitted in the forward wall of the bed V 25. For this purpose a dovetail slot 26 extends along the wall of the bed V and the scale is fitted in this slot having inclined upper and lower edges 27 for this purpose. Therefore it will be seen that the scale can be slid along and within this slot for adjustment, its fit being snug enough to prevent displacement and at the same time permitting movement upon application of moderate manual pressure. To enable manual engagement, an indention 28 is provided in the outer face of the scale at each end for insertion of the finger tip against a shoulder 29. This scale is graduated from both ends in sixty-fourths.

Knife edge pointers 30, 31, are fixed on the carriage, one at each end thereof, adjacent the scale, that is to say, in the same horizontal plane therewith. The right-hand pointer 30 is used for locating shoulder lengths from the tailstock end of the work, and the left-hand pointer 31 for locating the remaining shoulders on the opposite end after the work is reversed between centers.

The pointer elements specifically described are angular, being attached to the ends of the carriage or parts thereof by means of screws 32. A flange 33 of each respective element is disposed parallel with and close to the face of the scale bar, and has its outer end inclined or sharpened to a knife edge in the plane of the rear face so that accurate reading can be taken on the scale at this knife edge.

The setting of the automatic length stop dogs 16 which are tripped by the carriage for disconnecting the power is accomplished by using the scale in the following manner: First of all, the operator loosens all of the stop dogs along the control bar 17. The cutting edge of the tool 12 is then set to the tailstock end of the shaft 13 which is being turned, and the first stop dog is placed at this position for abutment by the carriage to locate the facing cut necessary to insure uniformity of length. The operator then moves the scale bar 24 by sliding the same in the groove until the zero mark at the right hand end is in line with the right hand pointer 30.

The carriage is moved to the left until the predetermined length of the first shoulder shows opposite the pointer, whereupon the second stop dog is moved against the trip lever of the carriage and clamped in position. This last operation is repeated for each shoulder. It will be apparent, therefore, that all shoulders are calculated from a zero reading on the scale.

When the multiple turning operation has been performed at one end of the shaft, the shaft is then turned end for end and the dogs re-set for the second operation in the following manner: The edge of the cutting tool is set to the last shoulder finished in the first operation, and the extreme left hand dog is set against the trip lever 18 at this position. Measuring is done from this shoulder to insure correct over-all length. The scale is then translated in the slot until the left-hand zero mark 31 is in line with the left-hand pointer. Thereupon the carriage is moved to the right until the length of the counterturn or the next shoulder position is indicated on the scale and the next clamp dog is set in position against the trip lever. This last operation is repeated for each succeeding shoulder.

The dogs are absolutely accurately set by the use of this scale and it is unnecessary to make several test measurements and trial settings to properly locate each dog. It is only necessary to bring the pointer up to the graduation on the scale indicating the counterturn or shoulder length and the dog is then set with the certainty that the shoulder will be the proper length.

Having described our invention, we claim:

1. In a lathe, a bed, a tool carriage slidably mounted on said bed for movement longitudinally thereof, said carriage including an apron housing, a stop element mounted on the bed adapted to be engaged by the carriage, a scale bar mounted in the side of the bed longitudinally thereof adjacent to and extending behind the apron housing whereby the amount of movement of the carriage can be readily ascertained for setting the stop element.

2. In a lathe, a bed, a carriage slidably mounted for movement longitudinally of said bed, a scale bar mounted longitudinally in said bed relative to said carriage and having graduations reading from each end and a pointer at each end of said carriage adjacent the scale bar for indicating the amount of travel of the carriage in either direction.

3. In a machine of the class described, a bed including a longitudinally disposed slot, a tool carriage movable on said bed, said tool carriage including an apron housing overhanging said slot, a measuring bar slidably mounted in said slot of said bed along the range of movement of said carriage relative to the bed, and indicator means carried by the carriage and movable in relation to the measuring bar.

4. In a lathe, a bed having longitudinally disposed slideways thereon, a tool carriage slidably disposed on said slideways, said bed having a longitudinally disposed dovetail slot in its side, a scale bar slidably mounted in said slot and having graduations reading from each end, and a pointer element mounted on each end of said carriage adjacent said scale bar whereby the travel of said carriage can be quickly determined by a direct reading at one or the other of said pointer elements.

5. In combination with a machine including a bed, a tool carriage movable on said bed, and adjustable stops on the bed for controlling the longitudinal feed of the tool carriage; a scale bar longitudinally adjustably mounted in the side of the bed along the range of movement of the tool carriage and adapted to be positioned dependent upon the position of the carriage, and pointer means on the carriage adjacent the scale bar and cooperating therewith to indicate carriage travel, whereby the operator can set the longitudinal stops in relation to the carriage after movement of the carriage predetermined distances indicated on the adjustable scale.

ALBERT E. ROBINSON.
WILLIAM G. HOELSCHER.